June 11, 1957
A. B. WAISNER
2,795,412
MEANS FOR ADJUSTING THE ANGULARITY OF
INDEPENDENTLY SPRUNG WHEELS
Filed March 7, 1955
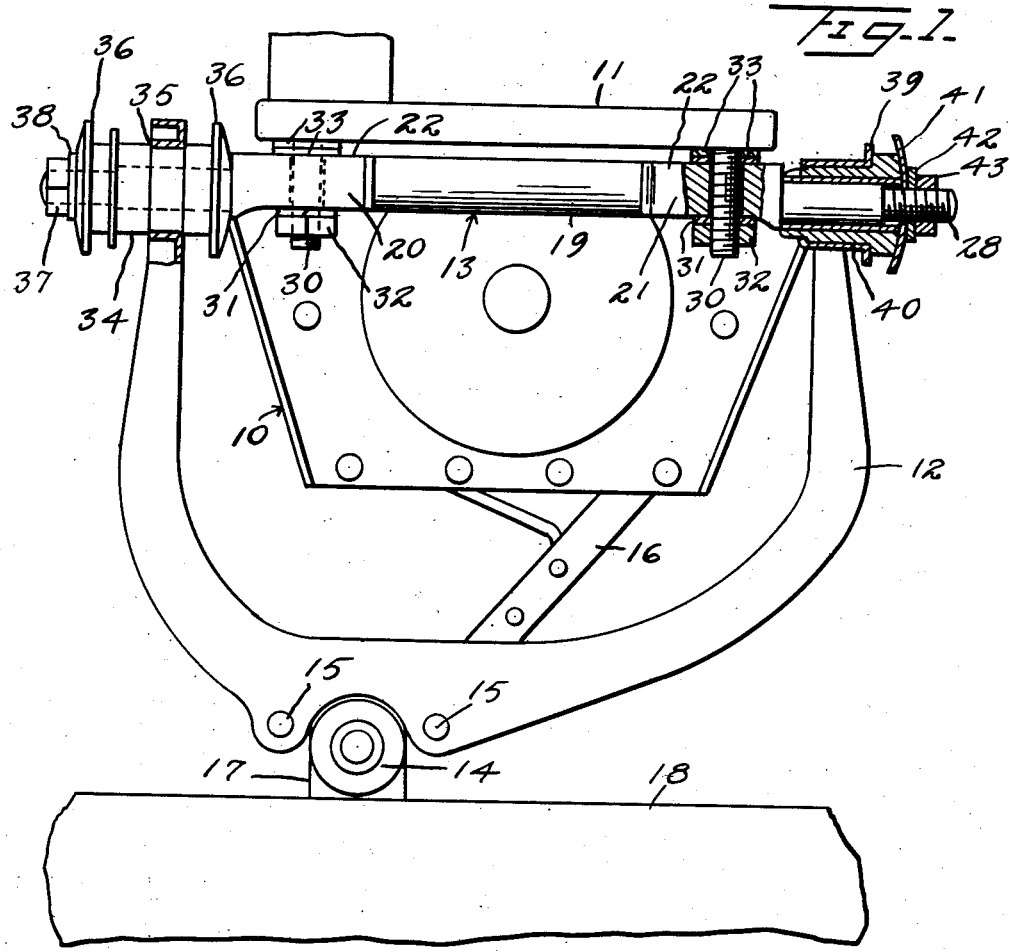
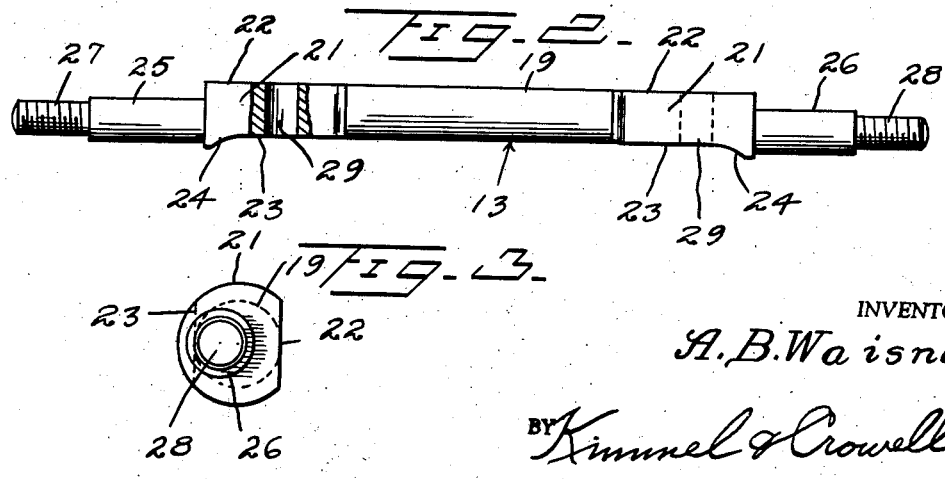
INVENTOR
A. B. Waisner
BY Kimmel & Crowell
ATTORNEYS

United States Patent Office 2,795,412
Patented June 11, 1957

---

2,795,412

MEANS FOR ADJUSTING THE ANGULARITY OF INDEPENDENTLY SPRUNG WHEELS

Alfred B. Waisner, Albemarle, N. C.

Application March 7, 1955, Serial No. 492,454

1 Claim. (Cl. 267—20)

The present invention relates to means for adjusting the angularity of independently sprung wheels and more particularly to means for increasing the range of adjustments available in a "Ball Point Front Suspension" of the type disclosed in the McCann Patent No. 2,556,767, issued on June 12, 1951.

The primary object of the invention is to provide a shaft which may be reversed to double the range of available adjustments.

Another object of the invention is to provide a structure of the character described which may be used as a replacement for existing shafts without further modifying the suspension structure.

A further object of the invention is to provide a shaft structure which while increasing the range of available adjustments does not change the method of adjustment used.

A still further object of the invention is to produce a shaft structure which will by increasing the range of adjustment available reduce the replacement incident in "out of line" front suspensions.

Other objects and advantages will become apparent in the following specification when read in light of the attached drawings, in which:

Figure 1 is a top plan view of the invention shown in place in a front suspension partially in section, partly broken away.

Figure 2 is a top plan view of the shaft partly in section.

Figure 3 is an end elevation of the shaft.

Now referring to the drawing in detail, wherein like reference numerals refer to like parts throughout the several figures, the reference numeral 10 designates, generally, a front cross member of a frame (not shown) of an automotive vehicle. The cross member 10 is provided with an upstanding flange 11 which extends perpendicularly to the surface upon which the vehicle is travelling and is aligned longitudinally with the longitudinal axis of the vehicle.

An upper pivot arm 12 is secured to the flange 11 by means of a shaft 13 and the pivot arm 12 is provided at its outer end with an upper ball point suspension member 14 which is secured to the arm 12 by bolts 15. A lower pivot arm 16 extends from the underside of the cross member 10 and connects to a second ball point suspension member (not shown) to support a spindle 17 carrying the wheel and tire 18.

The shaft 13 is provided with a central cylindrical portion 19 which has attached integrally thereto a cylindrical portion 20 on one end thereof and a cylindrical portion 21 on the other end thereof. The cylindrical portions 20 and 21 are flattened as at 22 to provide a bearing surface for attachment of the device to the flange 11. The bearing surfaces 22 are coextensive with the outer face of the cylindrical portion 19 and lie in the same vertical plane.

The cylindrical portions 20 and 21 are flattened on their opposite sides as at 23 with the surfaces 23 being parallel with the surfaces 22 and also aligned with the outer surface of the cylindrical portion 19. The outer ends of the flattened surfaces 23 are sloped outwardly as at 24. The cylindrical portion 20 has an eccentric offset shaft 25 extending outwardly therefrom with the axis of the shaft 25 parallel to the axis of the cylindrical portions 20 and 19. The cylindrical portion 21 has an eccentric offset shaft 26 extending outwardly therefrom with the axis thereof parallel to the axis of the cylindrical portions 21 and 19. The axes of the shafts 25 and 26 are aligned.

The shaft 25 has a reduced threaded outer end 27 formed thereon, and the shaft 26 likewise terminates in a reduced threaded portion 28.

Each of the cylindrical portions 20 and 21 is provided with a transverse bore 29 which extends through the cylindrical portions 20 and 21 perpendicular to the flattened faces 22 and 23 and with the axes of the bores 29 parallel. The bores 29 receive attaching bolts 30 for attaching the shaft 13 to the flange 11. The attaching bolts 30 are provided with lock washers 31 and nuts 32 for securing the shaft 13 on the bolts 30. Shims 33 are positioned between the shaft 13 and the flange 11 for reasons to be set forth later.

A bushing 34 is journalled on the shaft 25 and engages the end of the arm 12 through a flanged opening 35 to pivotally support the arm 12 on the shaft 25. The bushing 34 is positioned between arcuate washers 36 and retained on the shaft 25 by means of nut 37 and lock washer 38. The opposite end of the arm 12 is journalled to shaft 26 by means of a bushing 39 which extends through an opening 40 in the end of the arm 12 and is held in place on the shaft 26 by means of arcuate washer 41, lock washer 42 and nut 43.

In the adjustment of caster and camber in a front end suspension of the ball point type as disclosed in Patent No. 2,556,767, issued June 12, 1951, it is necessary to use shims 33 to move the arm 12 in or out as desired, adjusting the camber and the "king pin" inclination by varying the number of shims 33 which are placed under the cylindrical portion 20 with relation to the number that are placed under the cylindrical portion 21. The upper ball point suspension member 14 may be moved forwardly or rearwardly, thus varying the caster angle of the wheel to adjust the wheel to the proper alignment.

In the device as disclosed in the aforementioned patent and in practical applications now found on the market, the adjustment of the caster and camber angles is limited to the use of shims totaling a maximum of nine-sixteenths of an inch of thickness which limits the total camber adjustment to a movement of the shaft 13 of nine-sixteenths of an inch. The present invention provides the shaft 13 with offset or eccentric shafts 25 and 26 which may be positioned with either of the flattened surfaces 22 or the flattened surfaces 23 against the flange 11 so that the eccentric shafts 25 and 26 will be varied with relation to the flange 11, thus varying the outward adjustment of the arm 12.

The offset of the shafts 25 and 26 is approximately one-fourth of an inch, which gives a range of adjustment in reversing the shaft 13 of one-half inch. The same number of shims 33 previously used may now be used, increasing the total range of adjustment an additional nine-sixteenths of an inch to provide an adjustment of one and one-sixteenth inches.

Obviously the increased range in adjustment will permit alignment of the front end of the vehicle under conditions of distortion of parts which would require replacement in the limited adjustment constructions of prior art devices.

Having thus described the preferred embodiment of the invention, it should be understood that numerous modifications and dimensional changes may be resorted to without departing from the scope of the appended claim.

What is claimed is:

An upper inner pivot bar for attachment by bolting to front suspensions of the class described comprising an elongated centrally disposed cylindrical section, a pair of axially aligned integral cylindrical portions formed on opposite ends of said central cylindrical section, said cylindrical portions each having a substantially greater diameter than said central section and each having opposed flattened surfaces for selectively engaging said front suspension and extending tangent from said central section with the flattened surfaces on one side of said bar lying in one plane and the flattened surfaces on the opposite side of said bar lying in a second plane parallel to said first plane, and a radially offset cylindrical shaft extending from each of said cylindrical portions, said last named offset shafts being axially aligned and spaced from said front suspension by said selected flattened surface contact with said front suspension.

References Cited in the file of this patent

UNITED STATES PATENTS

| | | |
|---|---|---|
| 2,115,918 | Slack | May 3, 1938 |
| 2,344,896 | Phelps | Mar. 21, 1944 |
| 2,372,849 | Phelps | Apr. 3, 1945 |
| 2,502,744 | Parker | Apr. 4, 1950 |
| 2,631,866 | Leighton | Mar. 17, 1953 |

FOREIGN PATENTS

| | | |
|---|---|---|
| 603,199 | Great Britain | June 10, 1948 |